United States Patent [19]

Hasegawa

[11] Patent Number: 4,613,395

[45] Date of Patent: Sep. 23, 1986

[54] APPARATUS FOR BONDING A PRINTING PLATE ON A BASE FILM

[75] Inventor: Kazumi Hasegawa, Aichi, Japan

[73] Assignee: Isowa Industry Company, Ltd., Aichi, Japan

[21] Appl. No.: 637,823

[22] Filed: Aug. 6, 1984

[30] Foreign Application Priority Data

Aug. 6, 1983 [JP] Japan ................................ 58-144021

[51] Int. Cl.$^4$ ................................................ G01B 11/00

[52] U.S. Cl. .................................... 156/378; 33/184.5; 101/DIG. 12; 156/64; 156/270; 156/277; 156/280; 156/313; 156/388; 156/390; 350/113; 350/320

[58] Field of Search ................. 156/64, 313, 270, 378, 156/277, 388, 280, 390; 350/113, 320; 101/DIG. 12; 33/184.5

[56] References Cited

U.S. PATENT DOCUMENTS 2,223,357 12/1940 Nahmens .................... 101/DIG. 12
3,055,263 9/1962 Kuehne ............................... 350/113
3,773,594 11/1973 Aaron et al. ........................ 156/378

FOREIGN PATENT DOCUMENTS 552890 2/1958 Canada ........................ 101/DIG. 12

*Primary Examiner*—John J. Gallagher
*Attorney, Agent, or Firm*—Schwartz & Weinrieb

[57] ABSTRACT

Methods of bonding a printing plate on a base film and an apparatus therefor are disclosed. The apparatus includes a pair of support mechanisms, one of which is horizontally located and the other of which is disposed at a right angle with respect to the horizontal one. A strip of paper is reeved around the horizontal support mechanism, while a strip of film is reeved around the vertical one. A plotter is provided above and in conjunction with the horizontal support mechanism for marking the location on which to place a printing plate, on the paper reeved around the horizontal support mechanism. A half mirror is disposed in close proximity to both of said horizontal and vertical support mechanisms for projecting the location marked on the paper onto the film reeved around the vertical support mechanism. Using a lifter, the operator looks down the half mirror to view the location of a printing plate as projected onto the film, and bonds the printing plate to the base film in that projected location.

8 Claims, 4 Drawing Figures

APPARATUS FOR BONDING A PRINTING PLATE ON A BASE FILM

FIELD OF THE INVENTION

This invention relates to methods of bonding a printing plate on a base film and an apparatus therefor, and more particularly relates to such methods and apparatus characterized not only in making easy the determination of the location of a printing plate for a belt-type multicolor printing machine, but also in bonding all printing plates that will follow the first one in position with reference to the location of the preceding printing plate, thus avoiding a color shift in a multi-color printing.

BACKGROUND OF THE INVENTION belt printing press as shown in FIG. 1 which provides a desired printing length adjustable independently of the circumference of a plate cylinder is in use in the printing industry. In such a printing press, an endless belt 14 of a flexible resin film is reeved on a plate cylinder 10 and a tension roller 12 is movable toward or away from the plate cylinder 10 so as to adjust the distance between the axes of the cylinder and roller. A printing plate 16 is bonded on the film belt 14. An impression cylinder 18 is disposed in conjunction with the plate cylinder 10, and a continuous web of paper or the like 20 is passed between the two cylinders 10 and 18 while being pressed by both printing plate 16 and impression cylinder 18, thus printing the material 20.

In the belt printing press, a printing plate must be bonded in position on a flexible base film with strict accuracy. Heretofore, however, the location of a printing plate has been manually marked on a base film for the bonding thereof in position. The manual marking operation has been made based on the operator's skill acquired through long experience and his technical intuition, thus requiring a long period of time to determine the exact location of a printing plate which has been one of the major stumbling blocks to better efficiency in the printing preparations. Furthermore, for a multi-color printing, once a first-color printing plate has been bonded in position on its base film, the other printing plates (that is, the second-color printing plate, the third-color printing plate, and the like) that will follow must be bonded on their respective base films with reference to the location of the preceding printing plate so that no color shift occurs in the actual printing. Heretofore, however, each printing plate has been bonded without any regard to the positions of the other printing plates on their base films, often resulting in a color shift in multi-color printing.

OBJECT OF THE INVENTION

The primary object of the invention is to mechanize the operation of bonding a printing plate on a base film as conventionally performed manually based on the operator's experiences so that the time required for the printing preparations may be shortened to increase the operational efficiency.

SUMMARY OF THE INVENTION

For accomplishing the foregoing object, the invention provides a method for bonding a printing plate on a base film which comprises:

(a) reeving a strip of paper on a first support mechanism so as to provide an endless paper belt, said first support mechanism comprising a plate cylinder and a tension roller;

(b) marking the location on which to place a printing plate, on said paper belt reeved on said first support mechanism;

(c) reeving a strip of film on a second support mechanism so as to provide an endless base film, said second support mechanism having the same construction and dimensions as said first support mechanism, but disposed angularly relative to said first support mechanism;

(d) projecting said location of printing plate marked on said paper belt onto said base film reeved on said second support mechanism, by means of a half mirror; and (e) bonding the printing plate to said base film in the projected location.

Another object of the invention is to increase the efficiency of operation of bonding printing plates on base films and to avoid a color shift in a multi-color printing.

For accomplishing the foregoing object, the invention provides a method for bonding printing plates on base films which comprises:

(a) reeving a strip of paper on a first support mechanism so as to provide an endless paper belt, said first support mechanism comprising a plate cylinder and a tension roller;

(b) marking the location on which to place a first-color printing plate, on said paper belt reeved on said first support mechanism;

(c) reeving a strip of film on a second support mechanism so as to provide an endless base film for a first-color printing, said second support mechanism having the same construction and dimensions as said first support mechanism, but disposed angularly relative to said first support mechanism;

(d) projecting said location of first-color printing plate marked on said paper belt onto said base film reeved on said second support mechanism, by means of a half mirror;

(e) bonding the first-color printing plate to said base film in the projected location, thus providing a first-color printing film;

(f) removing said paper belt from said first support mechanism, and using said first-color printing film to make a first-color printing of a continuous web of paper;

(g) cutting off the printed length of paper from said continuous web of paper, and reeving it on said first support mechanism so as to provide an endless printed paper;

(h) removing said first-color printing film from said second support mechanism, and reeving another strip of film thereon so as to provide an endless base film for a second-color printing;

(i) projecting the printed portion of said printed paper reeved on said first support mechanism onto said base film for a second-color printing reeved on said second support mechanism, by means of said half mirror; and (j) bonding a second-color printing plate to said base film for a second-color printing in the projected location, thus providing a second-color printing film.

For applying the foregoing two methods, the invention provides an apparatus which comprises:

(a) a first belt support mechanism including a plate cylinder rotatable about its longitudinal axis and a tension roller having a longitudinal axis parallel to that of said plate cylinder and not only rotatable about said longitudinal axis thereof, but movable toward or away from said plate cylinder so as to adjust the distance between said longitudinal axes of plate cylinder and tension roller;

(b) a second belt support mechanism having the same construction and dimensions as said first belt support mechanism, but disposed angularly relative to said first belt support mechanism;

(c) a plotter located above said first belt support mechanism for marking the location on which to place a printing plate, on a strip of paper reeved on said first belt support mechanism;

(d) a half mirror disposed in close proximity to said plate cylinders of said first belt support mechanism and of said second belt support mechanism and at predetermined angles with respect to both of said first belt support mechanism and said second belt support mechanism, said predetermined angles being such that said location of a printing plate marked on said strip of paper reeved around said first belt support mechanism is projected onto a base film reeved on said second belt support mechanism by said half mirror; and (e) a means for transferring ink on a printing plate bonded on said base film reeved around said second belt support mechanism.

DETAILED DESCRIPTION OF THE INVENTION

Figure 2:
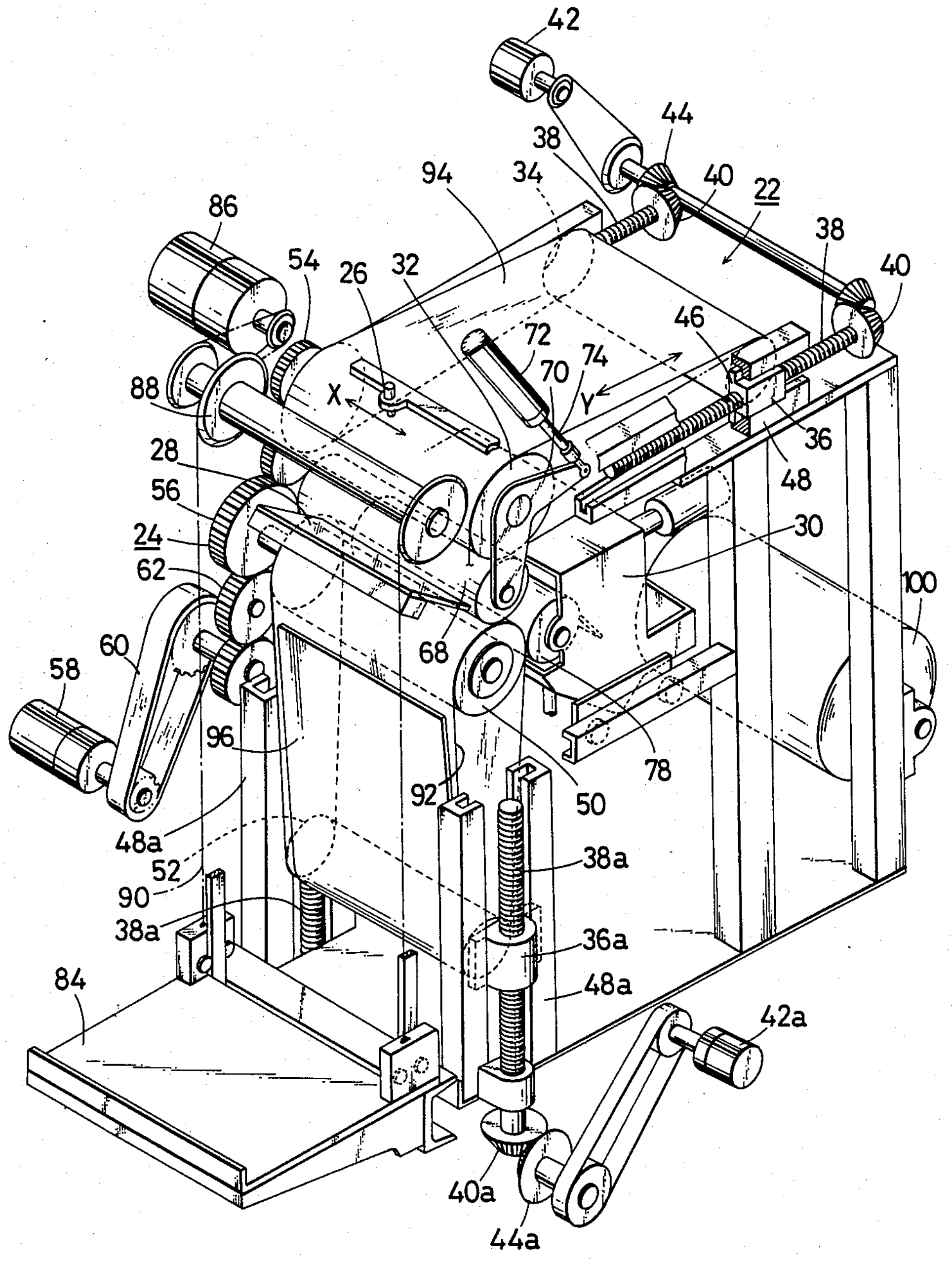
FIG. 2 shows an apparatus for bonding a printing plate on a base film according to the invention.
Figure 3:
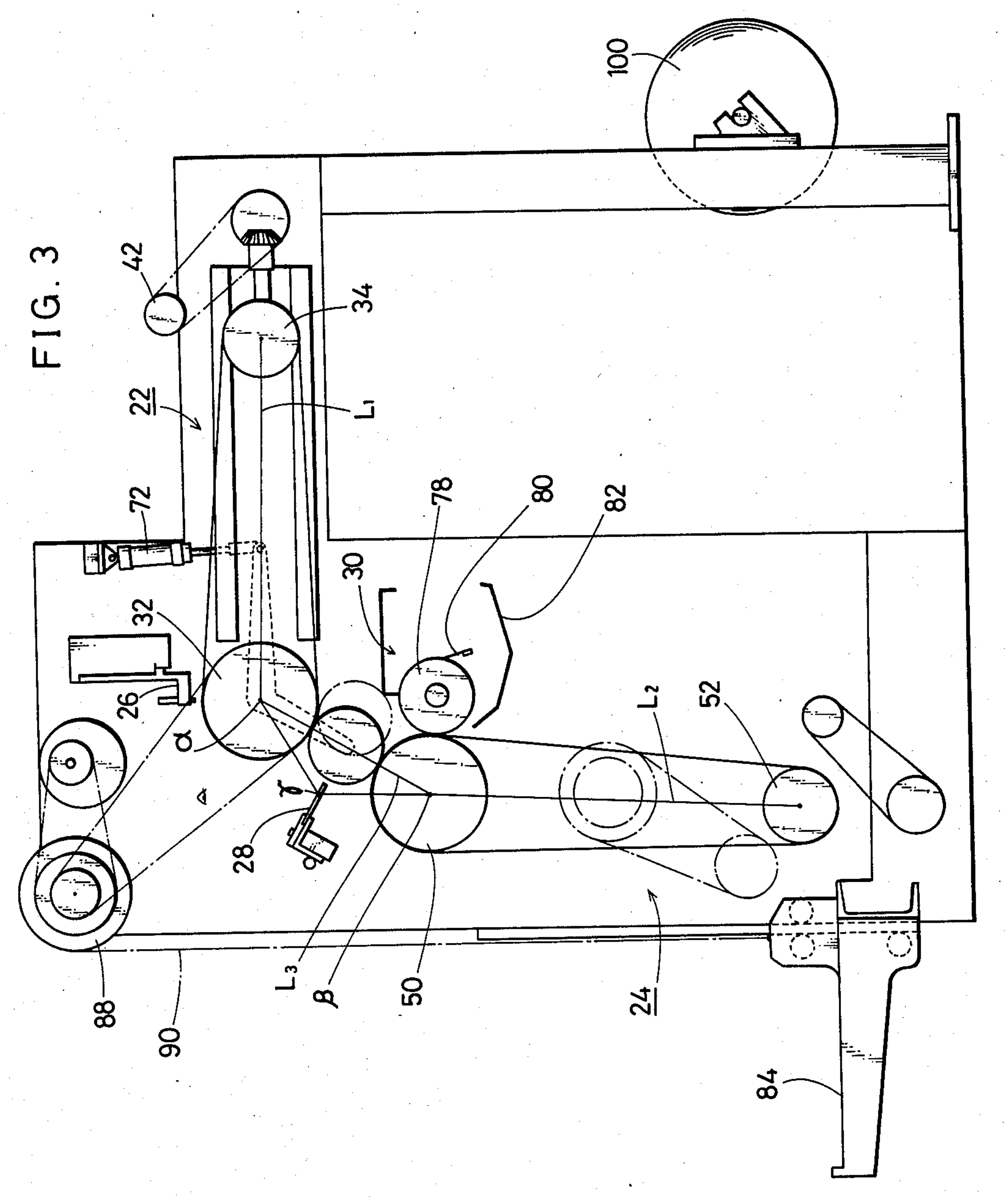
FIG. 3 is a side elevation of the apparatus of FIG. 2.

With reference to FIGS. 2 and 3, a preferred embodiment of the invention will now be described in detail. The apparatus according to the invention includes a first belt support assembly 22, a second belt support assembly 24, a plotter 26, a half mirror 28, and an inking mechanism 30.

The first belt support mechanism 22 comprises a plate cylinder 32 rotatable about its longitudinal axis and a tension roller 34 not only rotatable about its longitudinal axis which is parallel to that of the plate cylinder 32, but movable toward or away from the cylinder 32. A rotating shaft of the tension roller 34 is rotatably supported in bearing boxes 36,36, at its both ends. Each bearing box 36 is supported by a horizontal threaded shaft 38 which extends through the box 36 in engagement therewith. The threaded shaft 38 is provided with a bevel gear 40 at its one end which is engaged with another bevel gear 44 connected to a motor 42 through pulleys. Thus, when the motor 42 is operated, the threaded shaft 38 is rotated to move the bearing box 36 horizontally toward or away from the plate cylinder 32, thereby adjusting the distance between the longitudinal axis of the cylinder 32 and that of the tension roller 34. The bearing box 36 projects both upward and downward at its one side 46. A guide bar 48 is located along and in parallel with the threaded shaft 38. The guide bar 48 is provided with an inner groove which extends, therethrough in its lengthwise direction in such a manner as to receive or mate with the vertical projection 46 of the gear box 36, thus allowing the gear box 36 to move smoothly along the guide bar 48 in the horizontal directions.

As with the first belt support mechanism 22, a second belt support mechanism 24 comprises a plate cylinder 50 and a tension roller 52, and is also the same as the first mechanism 22 not only in the other details of construction and arrangement, but in its dimensions. The second mechanism 24, however, is located at an angle of, for example, 90° with respect to the first mechanism 22. In addition, the second mechanism 24 has exactly the same arrangement for adjusting the distance between the axes of the two support components (plate cylinder 50 and tension roller 52) as the first mechanism 22, and therefore the same portions of the adjusting arrangement of the second mechanism 24 as those of the corresponding arrangement of the first mechanism 22 are designated by the same numerals and the alphabetical letter a suffixed thereto. The belt support mechanisms 22 and 24 have such a positional relationship that a straight line L connecting the axes (longitudinal axes) of plate cylinder 32 and tension roller 34 of the first belt support mechanism 22 forms a right angle with a corresponding straight line $L_2$ connecting the axes of plate cylinder 50 and tension roller 52 of the second belt support mechanism 24 (that is, the second mechanism 24 is vertically disposed as seen in FIG. 3). The plate cylinders 32 and 50 are out of contact with, but opposed to each other in close mutual proximity.

As shown in FIG. 2, the plate cylinders 32 and 50 are provided with driven gears 54 and 56, respectively, at one end of their respective rotating shafts. The driven gears 54 and 56 are engaged with a train of gearings 62 which are connected to a motor 58 by means of a timing belt 60. The belt support mechanisms 22 and 24 are thus adapted to rotate simultaneously at the same speed and in the same direction by the common driving source.

A plotter 26 is provided in conjunction with the first belt support mechanism 22 and spaced upward from the plate cylinder 32 by a certain distance (FIGS. 2 and 3). The plotter 26 has a pen point supported by a suitable guide rail and adapted to reciprocate in directions indicated by X (FIG. 2) so as to mark the position (on a strip of paper reeved around the first belt support mechanism 22 which will be hereinafter described) on which to place a printing plate. The plotter 26 is adapted only to move in the directions X, that is, those along the length of the plate cylinder 32. However, when the first belt support mechanism 22 is operated, the paper reeved around the mechanism 22 (as hereinafter described) is moved in directions indicated by Y (FIG. 2), that is, those normal to the directions of movement of the plotter 26. Thus the combination of the movements in a total of four directions enables any required position for the printing plate to be marked on the paper. For control of such movements, a threaded shaft (not shown) for moving the plotter 26 in the directions X and the rotating shaft of the motor 58 for operating the first belt support mechanism 22 each may be provided with a pulse generator. In such an instance, the number of pulses produced by the pulse generators are computed for comparison so as to control the amount of movement of both plotter 26 and paper reeved around the belt support mechanism 22, thereby exactly marking the position on which to place the printing plate.

As clearly illustrated in FIG. 3, a half mirror 28 is provided in close proximity to the plate cylinders 32 and 50. The half mirror 28 is located in parallel with the longitudinal axes of the two plate cylinders, but in an angular manner. To be more exact, the half mirror 28 is so positioned that two imaginary straight lines drawn from a portion $\gamma$ of the mirror 28 to the longitudinal axes $\alpha$ and $\beta$ of the cylinders 32 and 50, respectively, each form an angle of 30° with an imaginary straight line $L_3$ connecting the above-mentioned two axes. Thus located angularly, the half mirror 28 functions to project a portion of the surface of the plate cylinder 32 (to be more exact, a strip of paper reeved thereon) mirrored therein, on the surface of the other plate cylinder 50 (to be more exact, a base film as hereinafter described).

A L-shaped operational lever 70 is pivotally connected to one end of the rotational shaft of the plate cylinder 32. Between the plate cylinders 32 and 50 is movably provided a press roll 68 having a rotational shaft which is connected to one end of the operational lever 70 at its one end. Above the first belt support mechanism 22 is fixedly mounted a double acting pneumatic cylinder 72 which has a piston rod 74 connected to the other end of the operational lever 70 at its one end. By this arrangement, when the piston rod 74 is operated, the lever 70 pivots about the rotational axis $\alpha$ of the plate cylinder 32 by a predetermined angle, so as to pivot the press roll 68 through an equal angular range. As clearly seen from FIG. 3, since the lever 70 is connected to the rotational shaft or pivot of the plate cylinder 32 as mentioned above, the press roll 68 is in constant contact with the plate cylinder 32 (to be more exact, an endless bclt reeved thereon) wherever it is moved by the lever 70, while it is adapted to contact the other plate cylinder 50 only when the trial printing of a continuous web of paper (as hereinafter described) is to be made.

The inking mechanism 30 includes an anilox roll 78 (in the case of flexographic printing), a doctor blade 80, and an ink pan 82. The anilox roll 78 is adapted to contact a printing plate (as hereinafter described) on the second belt support mechanism 24, only when the continuous web of paper is to be printed, so as to transfer ink onto the printing plate.

Numeral 84 designates a lifter connected to a chain 90 which is fitted onto a sprocket 88 connected to a motor 86. The lifter 84 is adapted to go up or down along a vertical guide post (not shown) when the motor 86 is operated. The lifter 84 is useful in the sticking of a printing plate on a base film 92 reeved around the second belt support mechanism 24; that is an operator stands upon the lifter 84, and then the lifter 84 is raised until the operator becomes able to look down the half mirror 28 from directly above the mirror 28 in order to view the position of a printing plate (that is, the position on which to attach the printing plate) marked on the endless belt (such as a strip of paper) around the first belt support mechanism 22, reflected in the mirror 28, and projected thereby onto the base film 92 around the second belt support mechanism 24 While thus loooking at the projected position of the printing plate, the operator mounts the printing plate in that position.

The printing-plate bonding apparatus as hereinbefore mentioned is used, as follows, to carry out a printing-plate bonding method according to the invention: Referring to FIG. 2, a strip of paper 94 with a predetermined width is reeved around the first belt support mechanism 22, that is, the plate cylinder 32 and the tension roller 34 so as to provide an endless paper belt. In this operation, the motor 42 is rotated to adjust the distance between the longitudinal axes of plate cylinder and tension roller so that the paper belt has the same length as base films to be reeved on a belt-type printing machine (for which the bonding apparatus is used). Then, the plotter 26 is moved in the directions X while operating the first belt support mechanism 22 to move the paper belt 94 in the directions Y, that is, forward and backward, thereby marking the location of a printing plate (that is, the location on which to place a printing plate) on the paper belt 94. Since the press roll 68 is in constant contact with the plate cylinder 32 as previously mentioned, the paper belt is pressed against the cylinder 32 as it runs. Therefore, there is no possibility of the belt 94 slipping on the cylinder 32. Alternatively, the belt 94 may be positively prevented from slipping by making a number of apertures through portions of the belt in proximity with its edges while at the same time providing the cylinder 32 with such teeth as to engage the apertures. With such an arrangement, the press roll 68 would not be required constantly to contact the cylinder 32.

On the other hand, a base film 92 for the first-color printing (to be reeved on a printing unit for the first color of the belt-type printing machine after a printing plate has been bonded thereto) is reeved on the second belt support mechanism 24 so as to provide an endless film belt. Using the lifter 84, the operator goes up to the level which allows him to look down the half mirror 28. Then the motor 58 is operated to rotate the first belt support mechanism 22 while the operator looks at the mirror 28 from directly thereabove. By this operation, the location of a printing plate marked on the paper belt 94 is projected on the base film 92 around the second support mechanism 24 (as rotated at the same time and speed as the first mechanism 22) by way of the half mirror 28. The projected location of a printing plate on the base film is the place or reference location on which to bond the printing plate. Looking at the projected location by means of the mirror 28, the operator then bonds the printing plate 96 to the film 92 in that location by using, for example, a pressure sensitive adhesive double coated tape.

The printing plate is thus bonded to the base film. This method enables an easy and exact determination of the location on which to place a printing plate as well as the bonding of the plate to the base film in the exact location determined. It no longer requires the manual work of the operator based on his experiences and professional intuition while remarkably increasing the efficiency of printing-plate bonding operation.

Figure 1:
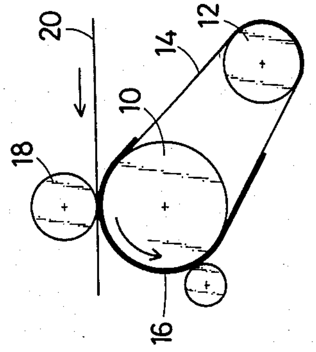
FIG. 1 illustrates a belt printing press.
Figure 4:
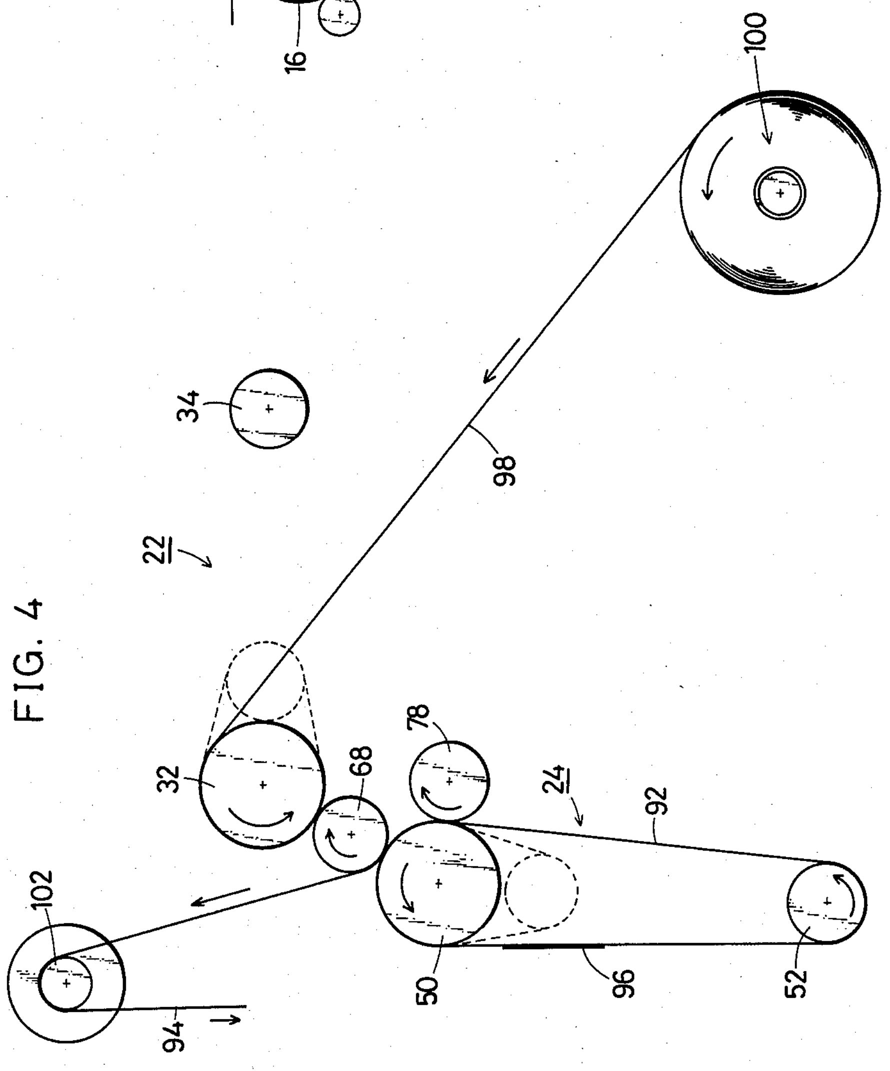
FIG. 4 illustrates a trial printing of a continuous web of paper by the apparatus of FIGS. 2 and 3.

If a two-color printing is to be made in the belt-type printing machine, a trial printing is made on a continuous web of paper 98 as follows, after the printing plate 96 has been bonded to the base film 92 as described above: Referring to FIG. 4, a continuous web of paper 98 is drawn out from, for example, a paper roll 100 and (partially) reeved around the plate cylinder 32 and the press roll 68 and brought into contact with the other plate cylinder 50. Before the paper 98 is thus drawn out, the paper belt 94 is to be removed from the first belt support mechanism 22. The paper 98 thus drawn out is reeled by a winder means (not shown) through a direction-changing roll 102. During this drawing-out operation, the piston rod 74 is moved downward to press the press roll 68 against the plate cylinder 50. Then, the anilox roll 78 of the inking mechanism 30 is brought into contact with the printing plate 96 bonded on the base film 92, and the motor 58 is operated to transfer ink from the anilox roll 78 and print the paper 98. Thus, the first color printing is made on the paper 98.

The portion of the paper 98 on which the first-color printing has been made is then cut off from the continuous web of paper 98 to provide a printed paper in a predetermined size. The printed paper is reeved on the first belt support mechanism 22 to provide an endless paper belt. On the other hand, the base film 92 for the first-color printing is removed from the second belt support mechanism 24, and a base film 92 for the second-color printing (to be reeved on a printing unit for the second color of the belt-type printing machine after a printing plate has been bonded thereto) is reeved on the second mechanism 24. Incidentally, when the continuous web of paper or the base film is reeved or removed in each belt support mechanism, the motor 42 or 42a is operated to adjust the distance between the axes of plate cylinder and tension roller. The motor 58 is then operated to run the printed paper 98 on the first mechanism 22 while the operator, on the raised lifter 84, looks at the half mirror 28 from directly thereabove. By this operation, the printed portion of the printed paper 98 is projected onto the new base film 92 by way of the mirror 28. Looking at the projected printed portion by means of the mirror 28, the operator then bonds a new printing plate 96 (for the second-color printing) to the base film 92 in that projected location by using a pressure sensitive adhesive double coated tape. The second printing plate 96 is thus bonded to the second base film 92 in exactly the same location as the first printing plate bonded on the first base film. The printing plates thus bonded on their respective base films for the two-color printing can be reliably employed for the printing units for the particular colors in the belt-type printing machine, since there is no practical difference in the positions of the two printing plates on their respective base films. Therefore, a clear two-color printing can be made without a color shift.

Furthermore, the foregoing bonding method and apparatus can be employed for a three- or more-color printing without effecting any change in the method and apparatus. That is, a printing plate is bonded on a base film for the third-color printing, as follows: The second printing film 92 on which the second printing plate 96 has been bonded is used to print the continuous web of paper 98 (trial printing). The second-color printed portion of the paper 98 is cut off from the continuous web 98 in a predetermined size, and shaped into an endless belt. Then, the paper belt is reeved on the first belt support mechanism 22. On the other hand, the second printing film 92 is removed from the second support mechanism 24, and a new base film 92 for the third-color printing (to be reeved on a printing unit for the third color of the belt-type printing machine after a printing plate has been bonded thereon) is reeved on the support mechanism 24. Then, the printed portion of the printed paper belt 98 on the first support mechanism 22 is projected onto the new base film 92 by means of the half mirror 28. Looking at the projected printed portion by the mirror 28, the operator bonds a new printing plate (for the third-color printing) to the film 92 in that projected location, thereby obtaining a third-color printing film. Further additional printing films can be obtained in the same manner.

Thus, according to the invention, the conventional manual work of bonding printing plates on base films as based on the operator's skill and technical intuition is completely mechanized to shorten the time required for the printing preparations as well as to increase the operational efficiency remarkably.

Moreover, according to the invention, once a printing plate is bonded on a first base film to be reeved on the first printing unit for the belt-type printing machine, the locations of the other printing plates (that will follow) on their respective base films are determined with reference to the location of the preceding printing plate on the preceding base film. Therefore, the printing films can be reliably employed for the printing units without a fear of a color shift occurring in a multi-color printing obviously, many modifications and variations of the present invention are possible in light of the above teachings. It is therefore to be understood that within the scope of the appended claims, the present invention may be practiced otherwise than as specifically described herein.

What is claimed is:

1. Apparatus for bonding a printing plate upon a base film, comprising:

first means for supporting a strip of paper thereon;

second means for supporting a base film thereon;

means operatively associated with said first supporting means for transporting said strip of paper in a first direction;

plotter means disposed above said first supporting means and movable in a second direction perpendicular to said first direction of movement of said strip of paper for marking said strip of paper at a predetermined location upon said strip of paper; and a half mirror interposed between said first and second supporting means, and said strip of paper and base film respectively supported thereon, for projecting an image of said marked location on said strip of paper onto said base film for determining a location upon said base film, corresponding to said marked location of said strip of paper, at which a printing plate can be secured.

2. Apparatus as set forth in claim 1, wherein said first supporting means comprises:

a plate cylinder rotatably mounted about its longitudinal axis;

a tension roller disposed parallel to said plate cylinder and rotatably mounted about the longitudinal axis thereof;

said strip of paper being disposed in the form of an endless paper belt about said tension roller and said plate cylinder; and means for adjusting the distance between said longitudinal axes of said plate cylinder and said tension roller.

3. Apparatus as set forth in claim 2, wherein said second supporting means comprises:

a plate cylinder rotatably mounted about its longitudinal axis;

a tension roller disposed parallel to said plate cylinder and rotatably mounted about its longitudinal axis;

said base film being disposed in the form of an endless belt about said tension roller and said plate cylinder; and means for adjusting the disposition of said tension roller relative to said plate cylinder so as to adjust the distance between said longitudinal axes of said plate cylinder and said tension roller.

4. Apparatus as set forth in claim 3, wherein:

a first plane containing the longitudinal axes of said plate cylinder and said tension roller of said first supporting means is disposed substantially perpendicular to a second plane containing the longitudinal axes of said plate cylinder and said tension roller of said second supporting means.

5. Apparatus as set forth in claim 4, wherein:

said half mirror is disposed equiangularly with respect to said first and second planes of said first and second supporting means.

6. Apparatus as set forth in claim 1, further comprising:

elevatable platform means for elevationally supporting operating personnel so as to facilitate optical sighting, of said image of said marked location on said strip of paper onto said base film through said half mirror.

7. Apparatus as set forth in claim 4, wherein:

said first plane is disposed substantially horizontally; and said second plane is disposed substantially vertical

8. Apparatus as set forth in claim 1, further comprising:

a printing plate secured upon said base film; and means for transferring ink from an ink reservoir to said printing plate.

* * * * *